United States Patent
Weber et al.

(10) Patent No.: US 10,208,607 B2
(45) Date of Patent: Feb. 19, 2019

(54) COOLING CIRCUIT FOR A MULTI-WALL BLADE

(71) Applicant: General Electric Company, Schenectady, NY (US)

(72) Inventors: David Wayne Weber, Simpsonville, SC (US); Gregory Thomas Foster, Greer, SC (US); Lana Maria Osusky, Rexford, NY (US)

(73) Assignee: General Electric Company, Schenectady, NY (US)

( * ) Notice: Subject to any disclaimer, the term of this patent is extended or adjusted under 35 U.S.C. 154(b) by 292 days.

(21) Appl. No.: 15/239,940

(22) Filed: Aug. 18, 2016

(65) Prior Publication Data

US 2018/0051574 A1 Feb. 22, 2018

(51) Int. Cl.
| | |
|---|---|
| *F01D 5/18* | (2006.01) |
| *F01D 25/12* | (2006.01) |
| *F01D 5/14* | (2006.01) |
| *F01D 9/02* | (2006.01) |
| *F02C 3/04* | (2006.01) |

(52) U.S. Cl.
CPC ............. *F01D 5/187* (2013.01); *F01D 5/147* (2013.01); *F01D 9/02* (2013.01); *F01D 25/12* (2013.01); *F02C 3/04* (2013.01); *F05D 2220/32* (2013.01); *F05D 2240/303* (2013.01); *F05D 2240/35* (2013.01); *F05D 2260/201* (2013.01); *F05D 2260/202* (2013.01); *F05D 2260/205* (2013.01)

(58) Field of Classification Search
CPC .......... F01D 5/183; F01D 5/186; F01D 5/187; F01D 5/188
See application file for complete search history.

(56) References Cited

U.S. PATENT DOCUMENTS

| | | | |
|---|---|---|---|
| 4,474,532 A | 10/1984 | Pazder | |
| 4,500,258 A | 2/1985 | Dodd et al. | |
| 4,650,399 A | 3/1987 | Craig et al. | |
| 4,753,575 A | 6/1988 | Levengood et al. | |

(Continued)

FOREIGN PATENT DOCUMENTS

| | | |
|---|---|---|
| EP | 2037081 A1 | 3/2009 |
| JP | 2002242607 A | 8/2002 |

OTHER PUBLICATIONS

U.S. Appl. No. 14/977,270, Notice of Allowance dated Jul. 13, 2018, (GEEN-0744-US), 24 pages.

(Continued)

*Primary Examiner* — Andrew H Nguyen
(74) *Attorney, Agent, or Firm* — Ernest G. Cusick; Hoffman Warnick LLC

(57) ABSTRACT

A cooling circuit according to an embodiment includes: a cooling circuit for a multi-wall blade, the cooling circuit including: a pressure side cavity with a surface adjacent a pressure side of the multi-wall blade; a suction side cavity with a surface adjacent a suction side of the multi-wall blade; a central cavity disposed between the pressure side and suction side cavities, the central cavity including no surfaces adjacent the pressure and suction sides of the multi-wall blade; a first leading edge cavity with surfaces adjacent the pressure and suction sides of the multi-wall blade; and at least one impingement opening for fluidly coupling the leading edge cavity with a second leading edge cavity.

17 Claims, 5 Drawing Sheets

(56) References Cited

U.S. PATENT DOCUMENTS

| | | | |
|---|---|---|---|
| 5,296,308 | A | 3/1994 | Caccavale et al. |
| 5,356,265 | A | 10/1994 | Kercher |
| 5,382,135 | A | 1/1995 | Green |
| 5,403,159 | A | 4/1995 | Green et al. |
| 5,702,232 | A | 12/1997 | Moore |
| 5,813,835 | A * | 9/1998 | Corsmeier ............. F01D 5/186 415/115 |
| 5,853,044 | A | 12/1998 | Wheaton et al. |
| 6,019,579 | A | 2/2000 | Fukuno et al. |
| 6,196,792 | B1 | 3/2001 | Lee et al. |
| 6,220,817 | B1 | 4/2001 | Durgin et al. |
| 6,264,428 | B1 | 7/2001 | Dailey et al. |
| 6,416,284 | B1 | 7/2002 | Demers et al. |
| 6,478,535 | B1 | 11/2002 | Chung et al. |
| 6,491,496 | B2 | 12/2002 | Starkweather |
| 6,705,836 | B2 | 3/2004 | Bourriaud et al. |
| 6,887,033 | B1 | 5/2005 | Phillips et al. |
| 6,916,155 | B2 | 7/2005 | Eneau et al. |
| 6,974,308 | B2 | 12/2005 | Halfmann et al. |
| 7,104,757 | B2 | 9/2006 | Gross |
| 7,217,097 | B2 | 5/2007 | Liang |
| 7,303,376 | B2 | 12/2007 | Liang |
| 7,416,391 | B2 | 8/2008 | Veltre et al. |
| 7,458,778 | B1 | 12/2008 | Liang |
| 7,481,623 | B1 | 1/2009 | Liang |
| 7,527,474 | B1 | 5/2009 | Liang |
| 7,527,475 | B1 | 5/2009 | Liang |
| 7,607,891 | B2 | 10/2009 | Cherolis et al. |
| 7,625,178 | B2 | 12/2009 | Morris et al. |
| 7,686,581 | B2 | 3/2010 | Brittingham et al. |
| 7,780,413 | B2 | 8/2010 | Liang |
| 7,780,415 | B2 | 8/2010 | Liang |
| 7,785,072 | B1 | 8/2010 | Liang |
| 7,819,629 | B2 | 10/2010 | Liang |
| 7,838,440 | B2 | 11/2010 | Park |
| 7,857,589 | B1 | 12/2010 | Liang |
| 7,862,299 | B1 | 1/2011 | Liang |
| 7,901,183 | B1 | 3/2011 | Liang |
| 7,914,257 | B1 | 3/2011 | Liang |
| 7,980,822 | B2 | 7/2011 | Cunha et al. |
| 8,011,888 | B1 | 9/2011 | Liang |
| 8,047,790 | B1 | 11/2011 | Liang |
| 8,057,183 | B1 | 11/2011 | Liang |
| 8,087,891 | B1 | 1/2012 | Liang |
| 8,157,505 | B2 | 4/2012 | Liang |
| 8,292,582 | B1 | 10/2012 | Liang |
| 8,444,386 | B1 | 5/2013 | Liang |
| 8,616,845 | B1 | 12/2013 | Liang |
| 8,678,766 | B1 | 3/2014 | Liang |
| 8,734,108 | B1 | 5/2014 | Liang |
| 10,054,055 | B2 | 8/2018 | Spangler et al. |
| 2003/0223862 | A1 | 12/2003 | DeMarche et al. |
| 2005/0008487 | A1 | 1/2005 | Lee et al. |
| 2005/0031452 | A1 | 2/2005 | Liang |
| 2005/0226726 | A1 | 10/2005 | Lee et al. |
| 2006/0222495 | A1 | 10/2006 | Liang |
| 2007/0128031 | A1 | 6/2007 | Liang |
| 2007/0128032 | A1 | 6/2007 | Lee et al. |
| 2007/0189896 | A1 | 8/2007 | Itzel et al. |
| 2008/0118366 | A1 | 5/2008 | Correia et al. |
| 2008/0175714 | A1 | 7/2008 | Spangler et al. |
| 2009/0104042 | A1 | 4/2009 | Liang |
| 2009/0175733 | A1 | 7/2009 | Poon et al. |
| 2010/0104419 | A1 | 4/2010 | Liang |
| 2011/0123310 | A1 | 5/2011 | Beattie et al. |
| 2011/0236221 | A1 | 9/2011 | Campbell |
| 2012/0082566 | A1 | 4/2012 | Ellis et al. |
| 2012/0207614 | A1 * | 8/2012 | Lee ................... F01D 5/186 416/97 R |
| 2013/0171003 | A1 | 7/2013 | Ellis et al. |
| 2014/0096538 | A1 | 4/2014 | Boyer et al. |
| 2015/0059355 | A1 | 3/2015 | Feigl et al. |
| 2015/0110641 | A1 | 4/2015 | Herzlinger et al. |
| 2015/0184519 | A1 | 7/2015 | Foster et al. |
| 2015/0184538 | A1 | 7/2015 | Smith |
| 2015/0322008 | A1 | 11/2015 | Hilpert et al. |
| 2016/0194965 | A1 | 7/2016 | Spangler |
| 2016/0312632 | A1 | 10/2016 | Hagan et al. |
| 2016/0312637 | A1 | 10/2016 | Duguay |
| 2017/0173672 | A1 | 6/2017 | Foster et al. |
| 2017/0175443 | A1 | 6/2017 | Pesticcio |
| 2017/0175540 | A1 | 6/2017 | Weber et al. |
| 2017/0175541 | A1 | 6/2017 | Weber et al. |
| 2017/0175542 | A1 | 6/2017 | Weber et al. |
| 2017/0175544 | A1 | 6/2017 | Smith et al. |
| 2017/0175547 | A1 | 6/2017 | Smith et al. |
| 2017/0175550 | A1 | 6/2017 | Smith et al. |
| 2017/0198594 | A1 | 7/2017 | Takamura et al. |

OTHER PUBLICATIONS

EP Search Report and Written Opinion for corresponding EP Patent Application No. 16203125.6 dated Apr. 28, 2017, 7 pages.
U.S. Appl. No. 14/977,102, Notice of Allowance dated Jul. 17, 2018, (GEEN-0695-US), 18 pages.
U.S. Appl. No. 14/977,175, Office Action 1 dated Nov. 24, 2017, (GEEN-0725-US), 25 pages.
U.S. Appl. No. 14/977,200, Office Action dated Dec. 19, 2017, (GEEN-0726-US), 23 pages.
U.S. Appl. No. 14/977,152, Final Office Action 1 dated Dec. 26, 2017, (GEEN-0697-US), 15 pages.
U.S. Appl. No. 14/977,238, Notice of Allowance dated Feb. 12, 2018, (GEEN-0727-US), 34 pages.
U.S. Appl. No. 14/977,247, Notice of Allowance dated Feb. 12, 2018, (GEEN-728-US), 24 pages.
U.S. Appl. No. 14/977,078, Office Action dated Apr. 19, 2018, (GEEN-0694-US), 39 pages.
U.S. Appl. No. 14/977,200, Notice of Allowance dated May 2, 2018, (GEEN-0726-US), 18 pages.
U.S. Appl. No. 14/977,270, Office Action dated Mar. 21, 2018, (GEEN-0744-US), 42 pages.
U.S. Appl. No. 14/977,124, Notice of Allowance dated Mar. 19, 2018, (GEEN-0696-US), 21 pages.
U.S. Appl. No. 14/977,102, Office Action dated Mar. 30, 2018, (GEEN-0695-US), 39 pages.
U.S. Appl. No. 14/977,152, Office Action 1 dated Sep. 14, 2017, (GEEN-0697-US), 15 pages.
U.S. Appl. No. 14/977,124, Office Action 1 dated Oct. 10, 2017, (GEEN-0696-US), 15 pages.
U.S. Appl. No. 15/239,968, Office Action dated Aug. 27, 2018, (GEEN-0815-US), 42 pages.
U.S. Appl. No. 15/239,930, Office Action dated Aug. 27, 2018, (GEEN-0818-US), 47 pages.
U.S. Appl. No. 15/239,985, Office Action dated Aug. 29, 2018, (GEEN-0816-US), 40 pages.
U.S. Appl. No. 14/977,078, Notice of Allowance dated Sep. 20, 2018, (GEEN-0694-US), 22 pages.
U.S. Appl. No. 15/239,930, Notice of Allowance dated Dec. 6, 2018, 10 pages.
U.S. Appl. No. 15/239,994, Office Action dated Dec. 10, 2018, 13 pages.
U.S. Appl. No. 15/239,968, Notice of Allowance dated Dec. 12, 2018, 18 pages.
U.S. Appl. No. 15/239,985, Notice of Allowance dated Dec. 12, 2018, 12 pages.

* cited by examiner

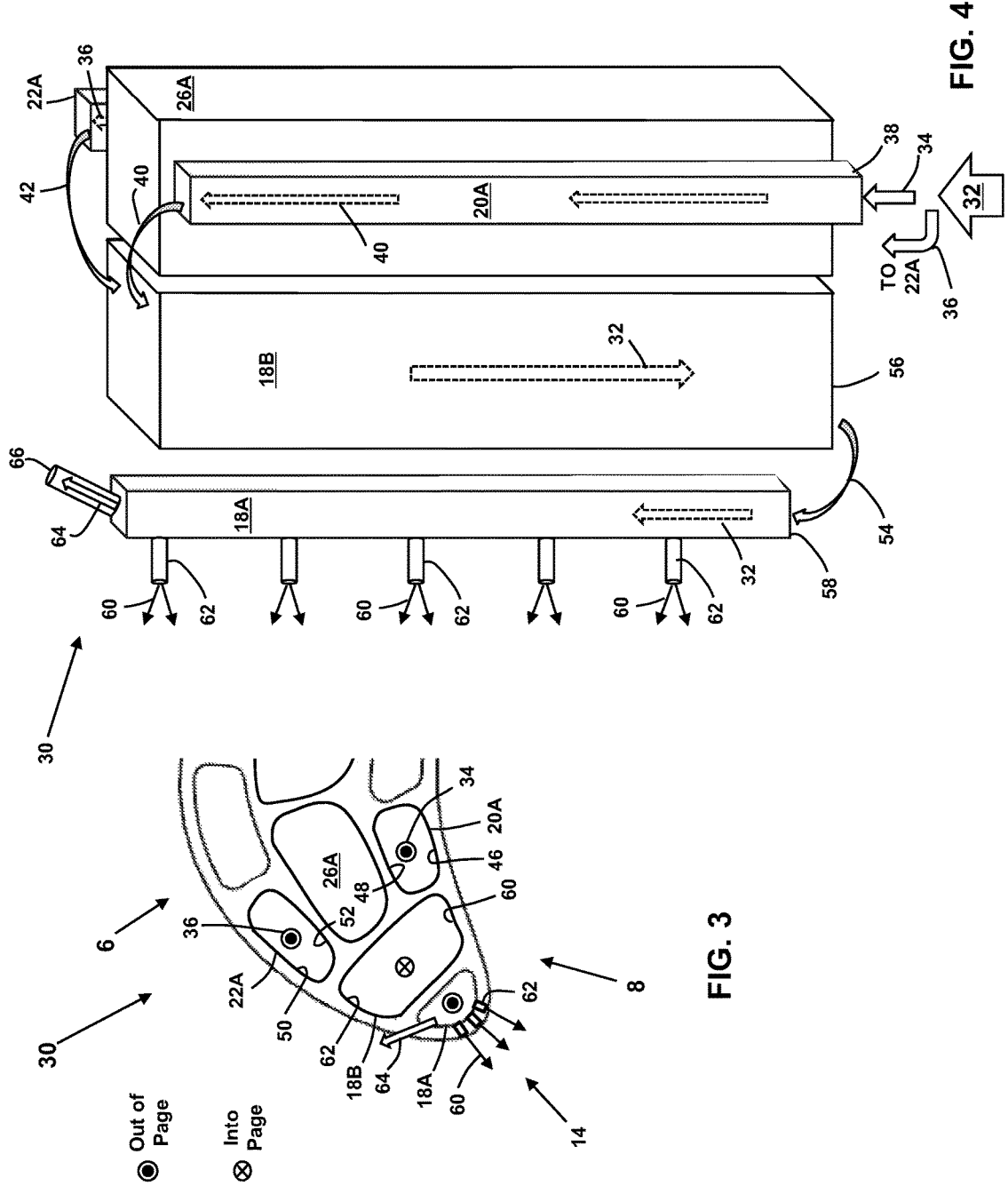

COOLING CIRCUIT FOR A MULTI-WALL BLADE

BACKGROUND OF THE INVENTION

This application is related to co-pending U.S. application Ser. Nos. 14/977,078; 14/977,102; 14/977,124; 14/977,152; 14/977,175; 14/977,200; 14/977,228 14/977,247 and Ser. No. 14/977,270, all filed on Dec. 21, 2016 and co-pending U.S. application Ser. Nos. 15/239,968; 15/239,994; 15/239,930 and 15/239,985, all filed on Aug. 18, 2016.

BACKGROUND OF THE INVENTION

The disclosure relates generally to turbine systems, and more particularly, to a cooling circuit for a multi-wall blade.

Gas turbine systems are one example of turbomachines widely utilized in fields such as power generation. A conventional gas turbine system includes a compressor section, a combustor section, and a turbine section. During operation of a gas turbine system, various components in the system, such as turbine blades, are subjected to high temperature flows, which can cause the components to fail. Since higher temperature flows generally result in increased performance, efficiency, and power output of a gas turbine system, it is advantageous to cool the components that are subjected to high temperature flows to allow the gas turbine system to operate at increased temperatures.

Turbine blades typically contain an intricate maze of internal cooling channels. Cooling air provided by, for example, a compressor of a gas turbine system may be passed through the internal cooling channels to cool the turbine blades.

Multi-wall turbine blade cooling systems may include internal near wall cooling circuits. Such near wall cooling circuits may include, for example, near wall cooling channels adjacent the outside walls of a multi-wall blade. The near wall cooling channels are typically small, requiring less cooling flow, while still maintaining enough velocity for effective cooling to occur. Other, typically larger, low cooling effectiveness central channels of a multi-wall blade may be used as a source of cooling air and may be used in one or more reuse circuits to collect and reroute "spent" cooling flow for redistribution to lower heat load regions of the multi-wall blade.

BRIEF DESCRIPTION OF THE INVENTION

A first aspect of the disclosure provides a cooling circuit for a multi-wall blade, the cooling circuit including: a pressure side cavity with a surface adjacent a pressure side of the multi-wall blade; a suction side cavity with a surface adjacent a suction side of the multi-wall blade; a first leading edge cavity with surfaces adjacent the pressure and suction sides of the multi-wall blade, the first leading edge cavity located forward of the pressure and suction side cavities; a second leading edge cavity with surfaces adjacent the pressure and suction sides of the multi-wall blade, the second leading edge cavity located forward of the first leading edge cavity; at least one leading edge film hole for fluidly coupling the second leading edge cavity to a leading edge of the multi-wall blade; and at least one channel for fluidly coupling the second leading edge cavity to a tip of the multi-wall blade.

A second aspect of the disclosure provides an apparatus, including: a multi-wall turbine blade; and a cooling circuit disposed within the multi-wall turbine blade, the cooling circuit including: a pressure side cavity with a surface adjacent a pressure side of the multi-wall blade; a suction side cavity with a surface adjacent a suction side of the multi-wall blade; a first leading edge cavity with surfaces adjacent the pressure and suction sides of the multi-wall blade, the first leading edge cavity located forward of the pressure and suction side cavities; a second leading edge cavity with surfaces adjacent the pressure and suction sides of the multi-wall blade, the second leading edge cavity located forward of the first leading edge cavity; at least one leading edge film hole for fluidly coupling the second leading edge cavity to a leading edge of the multi-wall blade; and at least one channel for fluidly coupling the second leading edge cavity to a tip of the multi-wall blade.

A third aspect of the disclosure provides a turbomachine, including: a gas turbine system including a compressor component, a combustor component, and a turbine component, the turbine component including a plurality of turbomachine blades, and wherein at least one of the turbomachine blades includes a multi-wall blade; and a cooling circuit disposed within the multi-wall blade, the cooling circuit including: a pressure side cavity with a surface adjacent a pressure side of the multi-wall blade; a suction side cavity with a surface adjacent a suction side of the multi-wall blade; a first leading edge cavity with surfaces adjacent the pressure and suction sides of the multi-wall blade, the first leading edge cavity located forward of the pressure and suction side cavities; a second leading edge cavity with surfaces adjacent the pressure and suction sides of the multi-wall blade, the second leading edge cavity located forward of the first leading edge cavity; at least one leading edge film hole for fluidly coupling the second leading edge cavity to a leading edge of the multi-wall blade; and at least one channel for fluidly coupling the second leading edge cavity to a tip of the multi-wall blade.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

FIG. 3 depicts a portion of the cross-sectional view of FIG. 2 showing a leading edge cooling circuit according to various embodiments.

FIG. 4 is a perspective view of the leading edge cooling circuit according to various embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure relates generally to turbine systems, and more particularly, to a cooling circuit for cooling a multi-wall blade.

In the Figures (see, e.g., FIG. 6), the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis "r" (see, e.g., FIG. 1), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location.

Figure 1:
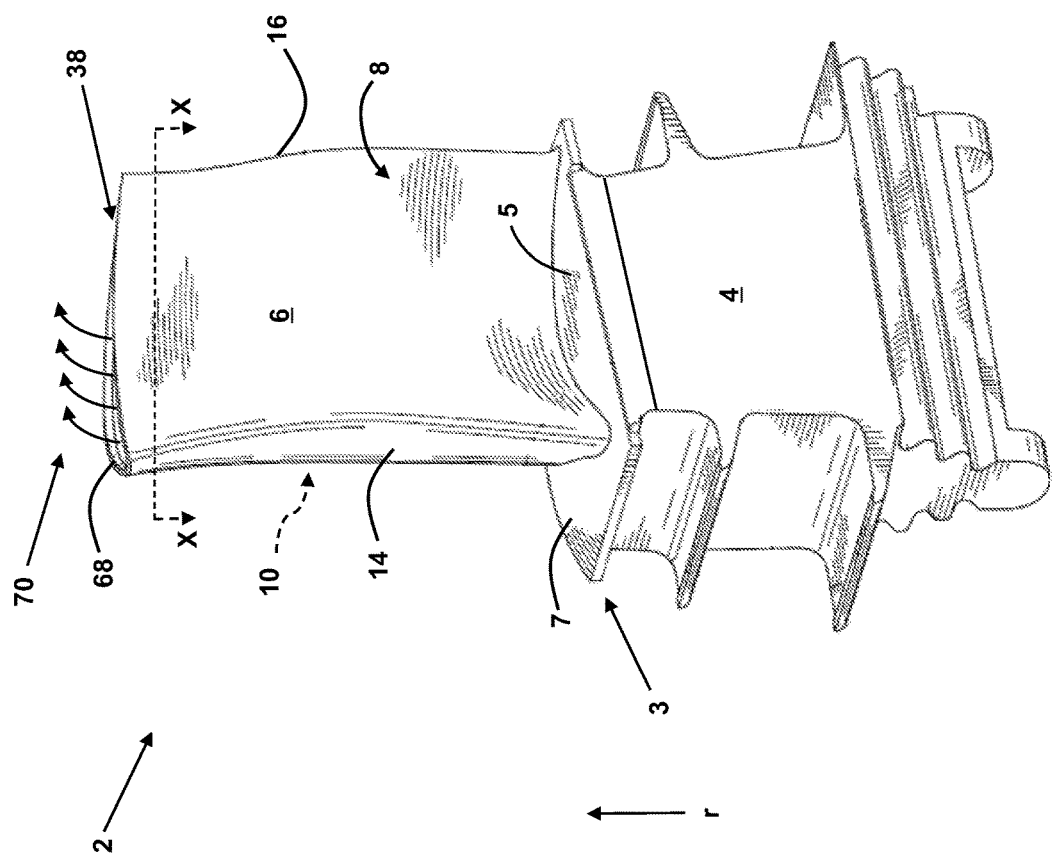
FIG. 1 shows a perspective view of a multi-wall blade according to embodiments.

Turning to FIG. 1, a perspective view of a turbomachine blade 2 is shown. The turbomachine blade 2 includes a shank 4 and a multi-wall blade 6 coupled to and extending radially outward from the shank 4. The multi-wall blade 6 includes a pressure side 8, an opposed suction side 10, and a tip area 38. The multi-wall blade 6 further includes a leading edge 14 between the pressure side 8 and the suction side 10, as well as a trailing edge 16 between the pressure side 8 and the suction side 10 on a side opposing the leading edge 14. The multi-wall blade 6 extends radially away from a platform 3 including a pressure side platform 5 and a suction side platform 7.

The shank 4 and multi-wall blade 6 may each be formed of one or more metals (e.g., nickel, alloys of nickel, etc.) and may be formed (e.g., cast, forged or otherwise machined) according to conventional approaches. The shank 4 and multi-wall blade 6 may be integrally formed (e.g., cast, forged, three-dimensionally printed, etc.), or may be formed as separate components which are subsequently joined (e.g., via welding, brazing, bonding or other coupling mechanism). The multi-wall blade 6 may be a stationary blade (nozzle) or a rotatable blade.

Figure 2:
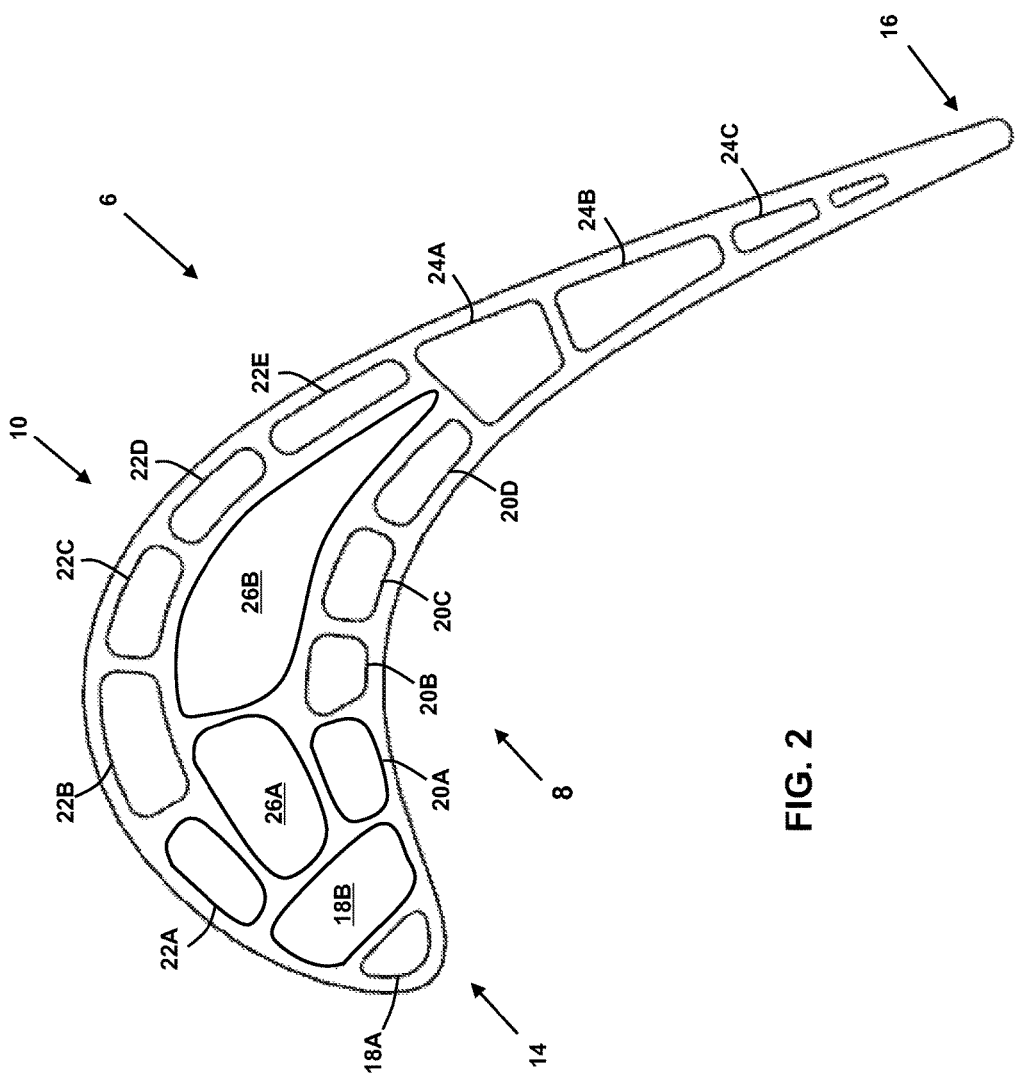
FIG. 2 is a cross-sectional view of the multi-wall blade of FIG. 1, taken along line X-X in FIG. 1 according to various embodiments.

FIG. 2 depicts a cross-sectional view of the multi-wall blade 6 taken along line X-X of FIG. 1. As shown, the multi-wall blade 6 may include a plurality of internal cavities. In embodiments, the multi-wall blade 6 includes a plurality of leading edge cavities 18A, 18B, a plurality of pressure side (outside) cavities 20A-20D, a plurality of suction side (outside) cavities 22A-22E, a plurality of trailing edge cavities 24A-24C, and a plurality of central cavities 26A, 26B. The leading edge cavity 18B is aft of the leading edge cavity 18A (closer to the trailing edge 16). The number of cavities 18, 20, 22, 24, 26 within the multi-wall blade 6 may vary, of course, depending upon for example, the specific configuration, size, intended use, etc., of the multi-wall blade 6. To this extent, the number of cavities 18, 20, 22, 24, 26 shown in the embodiments disclosed herein is not meant to be limiting. According to embodiments, various cooling circuits can be provided using different combinations of the cavities 18, 20, 22, 24, 26.

A leading edge serpentine cooling circuit 30 according to embodiments is depicted in FIGS. 3 and 4. As the name indicates, the leading edge cooling circuit 30 is located adjacent the leading edge 14 of the multi-wall blade 6, between the pressure side 8 and suction side 10 of the multi-wall blade 6.

Referring simultaneously to FIGS. 3 and 4, a flow of cooling air 32, generated for example by a compressor 104 of a gas turbine system 102 (FIG. 6), is fed through the shank 4 (FIG. 1) to the leading edge cooling circuit 30 (e.g., via at least one cooling air feed). A first portion 34 of the flow of cooling air 32 is fed to a base 38 of the pressure side cavity 20A, which is adjacent the pressure side 8 of the multi-wall blade 6. A second portion 36 of the flow of cooling air 32 is fed to a base (not shown) of the suction side cavity 22A, which is adjacent the suction side 10 of the multi-wall blade 6.

As depicted in FIGS. 3 and 4 together with FIG. 1, the flow of cooling air 34 flows radially outward through the pressure side cavity 20A toward a tip area 38 of the multi-wall blade 6, providing convection cooling. A turn 40 redirects the flow of cooling air 34 from the pressure side cavity 20A into the leading edge cavity 18B. In a corresponding manner, the flow of cooling air 36 flows radially outward through the suction side cavity 22A toward the tip area 38 of the multi-wall blade 6, providing convection cooling. A turn 42 redirects the flow of cooling air 36 from the suction side cavity 22A into the leading edge cavity 18B. The flow of cooling air 34 and the flow of cooling air 36 recombine in the leading edge cavity 18B to reform the flow of cooling air 32. The flow of cooling air 32 in the leading edge cavity 18B provides convection cooling. As shown in FIG. 3, the pressure side cavity 20A includes a surface 46 adjacent the pressure side 8 of the multi-wall blade 6, and a surface 48 adjacent the central cavity 26A. Further, the suction side cavity 22A includes a surface 50 adjacent the suction side 10 of the multi-wall-blade 6, and a surface 52 adjacent the central cavity 26A. The leading edge cavity 18B has a surface 60 adjacent the pressure side 8 of the multi-wall blade 6, and a surface 62 adjacent the suction side 10 of the multi-wall-blade 6. According to embodiments, the central cavity 26A is effectively adiabatic with no or very little fluid velocity and does not have any surfaces that are adjacent the pressure side 8 or suction side 10 of the multi-wall blade 6. According to embodiments, the turns 40, 42 (as well as other turns described below) may include a conduit, tube, pipe, channel, and/or any other suitable mechanism capable of passing air or any other gas from one location to another location within the multi-wall blade 6.

A turn 54 redirects the flow of cooling air 32 from a base 56 of the leading edge cavity 18B to a base 58 of the leading edge cavity 18A. The flow of cooling 32 flows radially outward through the leading edge cavity 18A toward a tip area 38 of the multi-wall blade 6, providing convection cooling.

As the flow of cooling air 32 passes radially outward through the leading edge cavity 18A, a portion 60 of the flow of cooling 32 is bled out of the leading edge cavity 18A to the leading edge 14 of the multi-wall blade 6 via at least one film hole 62 to provide film cooling of the leading edge 14. A portion 64 of the flow of cooling air 32 is directed by at least one channel 66 from the leading edge cavity 18A to the tip 68 (FIG. 1) of the multi-wall blade 6. The portion 64 of the flow of cooling air 32 may be exhausted from the tip 68 of the multi-wall blade 6 as tip film 70 to provide tip film cooling. In other embodiments, the portions 60, 64 of the flow of cooling air 32, or other portions of the flow of cooling air 32, may be routed to cooling circuits in the tip 68 or the platform 3 (or inner/outer sidewalls) and/or may be reused in other cooling circuits aft of the leading edge serpentine cooling circuit 30.

Figure 5:
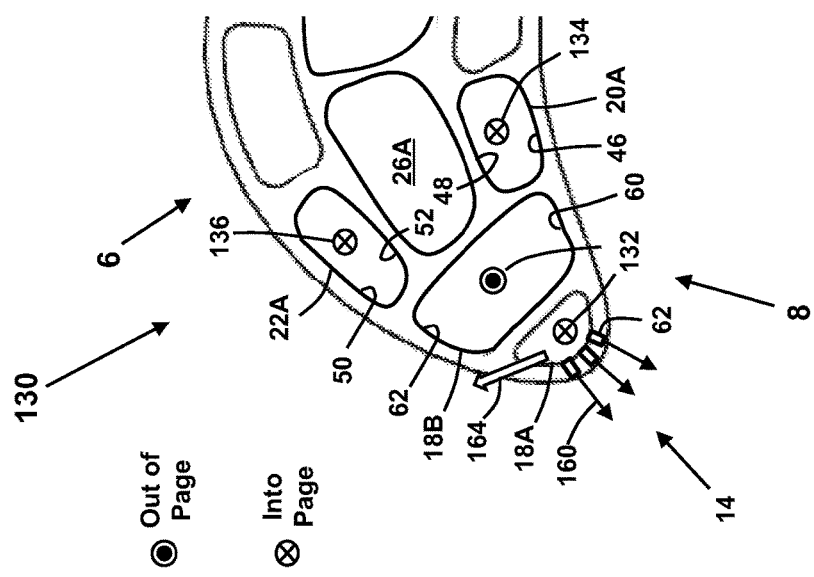
FIG. 5 depicts a portion of the cross-sectional view of FIG. 2 showing a leading edge cooling circuit according to various embodiments.

As depicted in FIG. 5, in other embodiments, the flow directions may be reversed. For example, in the leading edge serpentine cooling circuit 130 depicted in FIG. 5, a flow of cooling air (not shown) may be provided and split into a portion 134 and a portion 136 (e.g., via the shank 4 or one or more outer cavities in the multi-wall blade 6). The portions 134, 136 of the flow of cooling air flow radially inward through the pressure side cavity 20A and suction side cavity 22A, respectively. The portions 134, 136 are recombined into a flow of cooling air 132 in the leading edge cavity 18B, and flow radially outward through the leading edge cavity 18B. After passing through the leading edge cavity 18B, the flow of cooling air 132 is redirected into, and flows radially inward through, the leading edge cavity 18A. A portion 160 of the flow of cooling 132 flows out of the leading edge cavity 18A to the leading edge 14 of the multi-wall blade 6 via at least one film hole 62 to provide film cooling of the leading edge 14. A portion 164 of the flow of cooling air 32 is directed by at least one channel 66 from the leading edge cavity 18A to the tip 68 (FIG. 1) of the multi-wall blade 6. The portion 164 of the flow of cooling air 132 is exhausted from the tip 68 of the multi-wall blade 6 as tip film 70 (FIG. 1) to provide tip film cooling. In other embodiments, the portions 160, 164 of the flow of cooling air 132, or other portions of the flow of cooling air 132, may be routed to the platform 3 (or inner/outer sidewalls) and/or may be reused in other cooling circuits aft of the leading edge serpentine cooling circuit 130.

The cooling circuits 30, 130 have been described for use in the multi-wall blade 6 of a turbomachine blade 2, which rotates during operation of a gas turbine. However, the cooling circuits 30, 130 may also be used for cooling within stationary turbine nozzles of a gas turbine. Further, the cooling circuits 30, 130 may be used to cool other structures that require an internal flow of cooling air during operation.

Figure 6:
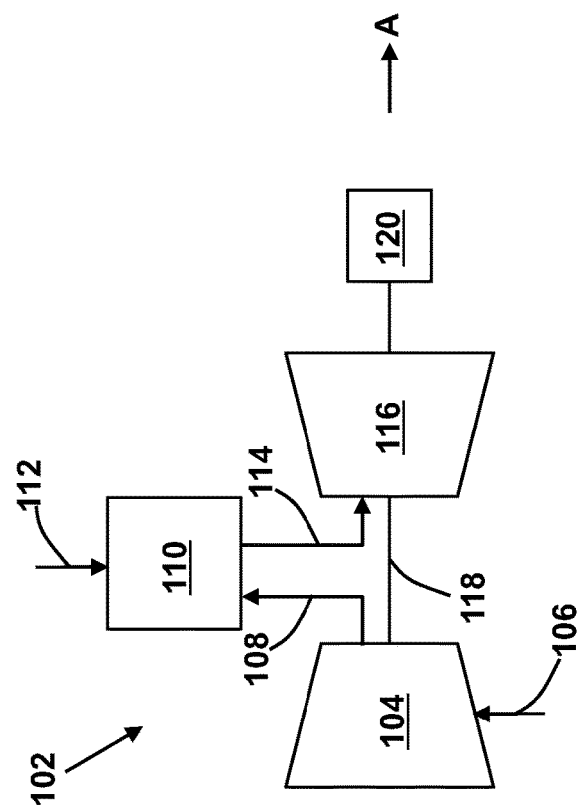
FIG. 6 is a schematic diagram of a gas turbine system according to various embodiments.

FIG. 6 shows a schematic view of gas turbomachine 102 as may be used herein. The gas turbomachine 102 may include a compressor 104. The compressor 104 compresses an incoming flow of air 106. The compressor 104 delivers a flow of compressed air 108 to a combustor 110. The combustor 110 mixes the flow of compressed air 108 with a pressurized flow of fuel 112 and ignites the mixture to create a flow of combustion gases 114. Although only a single combustor 110 is shown, the gas turbine system 102 may include any number of combustors 110. The flow of combustion gases 114 is in turn delivered to a turbine 116, which typically includes a plurality of the turbomachine blades 2 (FIG. 1). The flow of combustion gases 114 drives the turbine 116 to produce mechanical work. The mechanical work produced in the turbine 116 drives the compressor 104 via a shaft 118, and may be used to drive an external load 120, such as an electrical generator and/or the like.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling circuit for a multi-wall blade, comprising:
a pressure side cavity with a surface adjacent a pressure side of the multi-wall blade;
a suction side cavity with a surface adjacent a suction side of the multi-wall blade;
a first leading edge cavity with surfaces adjacent the pressure and suction sides of the multi-wall blade, the first leading edge cavity located forward of the pressure and suction side cavities;
a second leading edge cavity with surfaces adjacent the pressure and suction sides of the multi-wall blade, the second leading edge cavity located forward of the first leading edge cavity;
at least one leading edge film hole for fluidly coupling the second leading edge cavity to a leading edge of the multi-wall blade;
at least one channel for fluidly coupling the second leading edge cavity to a tip of the multi-wall blade;
a turn for directing a first portion of a flow of cooling air from the pressure side cavity into the first leading edge cavity;
a turn for directing a second portion of the flow of cooling air from the suction side cavity into the first leading edge cavity, the first and second portions of the flow of cooling air recombining into a recombined flow of cooling air in the first leading edge cavity; and
a turn for directing the recombined flow of cooling air from the first leading edge cavity into the second leading edge cavity.

2. The cooling circuit of claim 1, wherein a portion of the recombined flow of cooling air is exhausted from the second leading edge cavity to the leading edge of the multi-wall blade through the at least one leading edge film hole to provide film cooling of the leading edge of the multi-wall blade.

3. The cooling circuit of claim 1, wherein a portion of the recombined flow of cooling air is exhausted from the second leading edge cavity to the tip of the multi-wall blade through the at least one channel to provide film cooling of the tip of the multi-wall blade.

4. The cooling circuit of claim 1, wherein the first and second portions of the flow of cooling air and the recombined flow of cooling air in the second leading edge cavity flow in a first direction through the multi-wall blade, and wherein the recombined flow of cooling air in the first leading edge cavity flows in a second direction through the multi-wall blade.

5. The cooling circuit of claim 4, wherein the first direction is radially outward through the multi-wall blade, and wherein the second direction is radially inward through the multi-wall blade.

6. The cooling circuit of claim 4, wherein the first direction is radially inward through the multi-wall blade, and wherein the second direction is radially outward through the multi-wall blade.

7. An apparatus comprising:
a multi-wall turbine blade; and
a cooling circuit disposed within the multi-wall turbine blade, the cooling circuit including:
a pressure side cavity with a surface adjacent a pressure side of the multi-wall blade;
a suction side cavity with a surface adjacent a suction side of the multi-wall blade;
a first leading edge cavity with surfaces adjacent the pressure and suction sides of the multi-wall blade, the first leading edge cavity located forward of the pressure and suction side cavities;
a second leading edge cavity with surfaces adjacent the pressure and suction sides of the multi-wall blade, the second leading edge cavity located forward of the first leading edge cavity;
at least one leading edge film hole for fluidly coupling the second leading edge cavity to a leading edge of the multi-wall blade;
at least one channel for fluidly coupling the second leading edge cavity to a tip of the multi-wall blade;
a turn for directing a first portion of a flow of cooling air from the pressure side cavity into the first leading edge cavity;
a turn for directing a second portion of the flow of cooling air from the suction side cavity into the first leading edge cavity, the first and second portions of the flow of cooling air recombining into a recombined flow of cooling air in the first leading edge cavity; and
a turn for directing the recombined flow of cooling air from the first leading edge cavity into the second leading edge cavity.

8. The apparatus of claim 7, wherein a portion of the recombined flow of cooling air is exhausted from the second leading edge cavity to the leading edge of the multi-wall blade through the at least one leading edge film hole to provide film cooling of the leading edge of the multi-wall blade.

9. The apparatus of claim 7, wherein a portion of the recombined flow of cooling air is exhausted from the second leading edge cavity to the tip of the multi-wall blade through the at least one channel to provide film cooling of the tip of the multi-wall blade.

10. The apparatus of claim 7, wherein the first and second portions of the flow of cooling air and the recombined flow of cooling air in the second leading edge cavity flow in a first direction through the multi-wall blade, and wherein the recombined flow of cooling air in the first leading edge cavity flows in a second direction through the multi-wall blade.

11. The apparatus of claim 10, wherein the first direction is radially outward through the multi-wall blade, and wherein the second direction is radially inward through the multi-wall blade.

12. The apparatus of claim 10, wherein the first direction is radially inward through the multi-wall blade, and wherein the second direction is radially outward through the multi-wall blade.

13. A turbomachine, comprising:
a gas turbine system including a compressor component, a combustor component, and a turbine component, the turbine component including a plurality of turbomachine blades, and wherein at least one of the turbomachine blades includes a multi-wall blade; and
a cooling circuit disposed within the multi-wall blade, the cooling circuit including:
a pressure side cavity with a surface adjacent a pressure side of the multi-wall blade;
a suction side cavity with a surface adjacent a suction side of the multi-wall blade;
a first leading edge cavity with surfaces adjacent the pressure and suction sides of the multi-wall blade, the first leading edge cavity located forward of the pressure and suction side cavities;
a second leading edge cavity with surfaces adjacent the pressure and suction sides of the multi-wall blade, the second leading edge cavity located forward of the first leading edge cavity;
at least one leading edge film hole for fluidly coupling the second leading edge cavity to a leading edge of the multi-wall blade;
at least one channel for fluidly coupling the second leading edge cavity to a tip of the multi-wall blade;
a turn for directing a first portion of a flow of cooling air from the pressure side cavity into the first leading edge cavity;
a turn for directing a second portion of the flow of cooling air from the suction side cavity into the first leading edge cavity, the first and second portions of the flow of cooling air recombining into a recombined flow of cooling air in the first leading edge cavity; and
a turn for directing the recombined flow of cooling air from the first leading edge cavity into the second leading edge cavity.

14. The turbomachine of claim 13, wherein a first portion of the recombined flow of cooling air is exhausted from the second leading edge cavity to the leading edge of the multi-wall blade through the at least one leading edge film hole to provide film cooling of the leading edge of the multi-wall blade, and wherein a second portion of the recombined flow of cooling air is exhausted from the second leading edge cavity to the tip of the multi-wall blade through the at least one channel to provide film cooling of the tip of the multi-wall blade.

15. The turbomachine of claim 13, wherein the first and second portions of the flow of cooling air and the recombined flow of cooling air in the second leading edge cavity flow in a first direction through the multi-wall blade, and wherein the recombined flow of cooling air in the first leading edge cavity flows in a second direction through the multi-wall blade.

16. The turbomachine of claim 15, wherein the first direction is radially outward through the multi-wall blade, and wherein the second direction is radially inward through the multi-wall blade.

17. The turbomachine of claim 15, wherein the first direction is radially inward through the multi-wall blade, and wherein the second direction is radially outward through the multi-wall blade.

* * * * *